US011904563B1

United States Patent
Gore et al.

(10) Patent No.: US 11,904,563 B1
(45) Date of Patent: Feb. 20, 2024

(54) SYSTEM, APPARATUS AND METHOD FOR PROGRAMMABLE LOGIC CONTROL OF PRESSURE IN A TIRE CURING PRESS BLADDER

(71) Applicants: Teddy Lee Gore, Paris, TN (US); Edgar Pearson Brazelton, Paris, TN (US)

(72) Inventors: Teddy Lee Gore, Paris, TN (US); Edgar Pearson Brazelton, Paris, TN (US)

( * ) Notice: Subject to any disclaimer, the term of this patent is extended or adjusted under 35 U.S.C. 154(b) by 259 days.

(21) Appl. No.: 17/302,779

(22) Filed: May 12, 2021

Related U.S. Application Data

(60) Provisional application No. 63/023,551, filed on May 12, 2020.

(51) Int. Cl.
*B29D 30/06* (2006.01)

(52) U.S. Cl.
CPC .. *B29D 30/0662* (2013.01); *B29D 2030/0675* (2013.01)

(58) Field of Classification Search
CPC .............. B29D 30/0662; B29D 2030/0675
USPC .......................................... 156/64
See application file for complete search history.

(56) References Cited

U.S. PATENT DOCUMENTS

| | | | |
|---|---|---|---|
| 3,640,653 A * | 2/1972 | Laenen | B29D 30/0603 425/38 |
| 3,794,457 A | 2/1974 | Gazuit | |
| 4,502,857 A | 3/1985 | Hinks | |
| 4,744,931 A | 5/1988 | Trapp | |
| 4,779,206 A | 10/1988 | Mattson et al. | |
| 5,019,318 A | 5/1991 | Mattson | |
| 5,256,348 A | 10/1993 | Waller | |
| 5,522,716 A | 6/1996 | Ureshino | |
| 5,609,136 A * | 3/1997 | Tuken | F02D 41/32 123/446 |
| 6,508,896 B1 | 1/2003 | Jao et al. | |
| 6,841,102 B2 | 1/2005 | Cole | |
| 7,001,559 B2 | 2/2006 | Dobayashi et al. | |
| 7,987,697 B2 | 8/2011 | Pickel | |
| 8,366,426 B2 | 2/2013 | Singh et al. | |
| 9,108,374 B2 | 8/2015 | Rodgers et al. | |
| 10,022,928 B2 | 7/2018 | Satrape et al. | |
| 2006/0260735 A1 | 11/2006 | Mancini | |
| 2020/0031025 A1 | 1/2020 | Gore | |

* cited by examiner

*Primary Examiner* — Matthew J Daniels
*Assistant Examiner* — Gregory C. Grosso
(74) *Attorney, Agent, or Firm* — Squire Patent Consulting & IP Law LLC; Brendan E. Squire

(57) ABSTRACT

A system, apparatus, and method for control of pressure in a tire curing press bladder. The present invention learns from a previous duty cycle by saving the data from those duty cycles. The data is analyzed, and program outputs are optimized for execution of the subsequent cycle. The pressure in the tire bladder is more accurately controlled to achieve desired set point values and significantly reduce overshoot and undershoot conditions. The system may be implemented with an appropriately programmed programmable logic controller (PLC).

5 Claims, 4 Drawing Sheets

SYSTEM, APPARATUS AND METHOD FOR PROGRAMMABLE LOGIC CONTROL OF PRESSURE IN A TIRE CURING PRESS BLADDER

CROSS-REFERENCE TO RELATED APPLICATION

This application claims the benefit of priority of U.S. provisional application No. 63/023,551 filed May 12, 2020, the contents of which are herein incorporated by reference.

BACKGROUND OF THE INVENTION

The present invention relates to systems, apparatus, and methods for programmable logic control (PLC) in tire manufacturing processes, and more particularly to pressure control in a tire curing press bladder.

During tire manufacturing processes, the pressure inside a tire curing press bladder needs to be accurately controlled. Controlling the pressure accurately with traditional PID (proportional, integral, derivative) technology is problematic, especially when the press is opened and closing, typically during green tire transfer processes.

Current PID programs have a tendency to overshoot and undershoot pressure set points and do not respond in a timely manner to disturbances in the system.

As can be seen there is a need for an improved system, method, and apparatus for controlling pressure within the tire curing press bladder.

SUMMARY OF THE INVENTION

In one aspect of the present invention, a system for operating a tire curing press is disclosed. The system includes a control valve in communication with a source of pressurized fluid. The tire curing press has a tire curing bladder that is selectively pressurized by the source of pressurized fluid by an operation of the control valve. A pressure transducer is configured to measure a pressure of the tire curing bladder. A programmable logic controller (PLC) is configured to receive a pressure signal from the pressure transducer and provide an output to operate the control valve during a duty cycle of the tire curing bladder to achieve a desired setpoint in the tire curing bladder during the duty cycle. The output for a subsequent duty cycle is determined based on an error correction to a performance parameter of a previous duty cycle.

In some embodiments, the performance parameter is a data array comprising: the pressure of the tire curing bladder and a valve signal output, measured at a plurality of temporal positions within the previous duty cycle.

In some embodiments, the data array further comprises the desired setpoint at one or more of the plurality of temporal positions within the previous duty cycle.

In some embodiments, the error correction further comprising a lag adjustment to the plurality of temporal positions within the previous duty cycle.

In other aspects of the invention, a method for controlling a tire curing bladder in a tire curing press is disclosed. The method includes measuring a plurality of performance parameters for each of a valve output signal controlling a pressure control valve supplying a source of pressurized fluid to the tire curing bladder and a pressure within the tire curing bladder during a first duty cycle of the tire curing press. The plurality of performance parameters are stored as a data array representing a plurality of temporal positions within the first duty cycle. The plurality of performance parameters are analyzed to determine a corrected valve signal output to obtain a desired setpoint within the tire curing bladder. The corrected valve signal output is applied to the pressure control valve during a subsequent duty cycle.

In some embodiments, the data array further includes the desired setpoint at the plurality of temporal positions.

In some embodiments, a lag is applied to the corrected valve signal output.

In some embodiments the method also includes adjusting the valve output signal to reduce one or more of an overshoot condition and an undershoot condition of the pressure from the desired setpoint.

The valve output signal at a selected temporal location in the subsequent duty cycle include the valve output signal in the first duty cycle at a corresponding temporal location in the first duty cycle, and an error correction value for the corresponding temporal location in the first duty cycle.

The error correction value includes a deviation of the pressure from the desired setpoint expressed as a percentage.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provide a system, method, and apparatus to control pressure within the tire curing bladder that learns from operational parameters of previous cycles by saving the data from those cycles. The data is then analyzed and algorithms alter the program for utilization in a subsequent cycle to improve operational parameters. Utilizing the features of the present invention, the pressure in the tire curing bladder is more accurately controlled.

Figure 1:
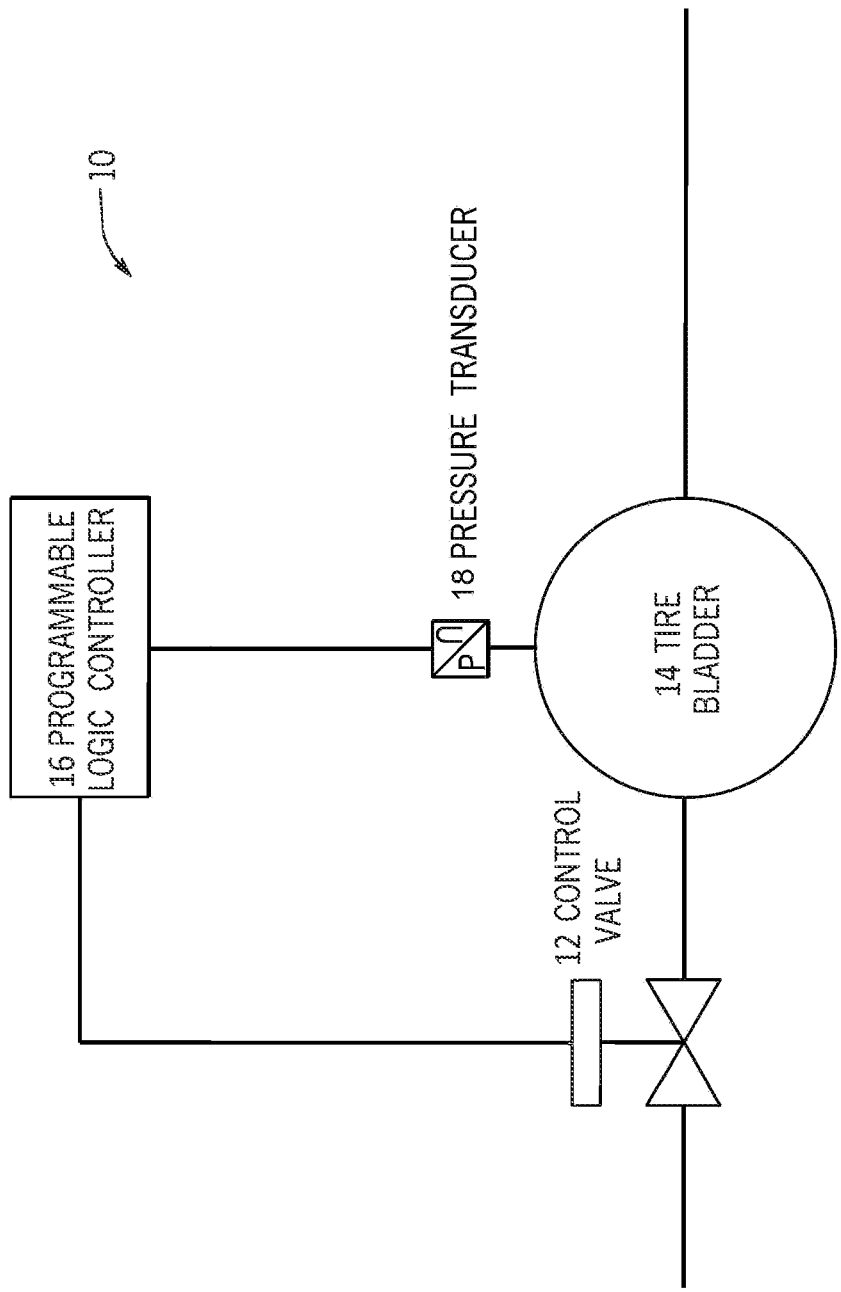
FIG. 1 is a simplified schematic diagram of a control system for a tire curing bladder.

As seen in reference to FIG. 1, a tire curing bladder control system 10 is illustrated. A control valve 12 is provided in line to control inflation of the tire curing bladder 14. A programmable logic controller (PLC) 16 is configured to control the opening and closing of the control valve 12. A pressure transducer 18 monitors the pneumatic pressure within the tire curing bladder 14 and communicates the monitored pneumatic pressure with the PLC 16. Controlling the tire curing bladder pressure accurately with traditional PID (proportional, integral, derivative) technology is problematic, especially when the press of the tire curing bladder 14 is operated from an open to a closed condition.

Figure 2:
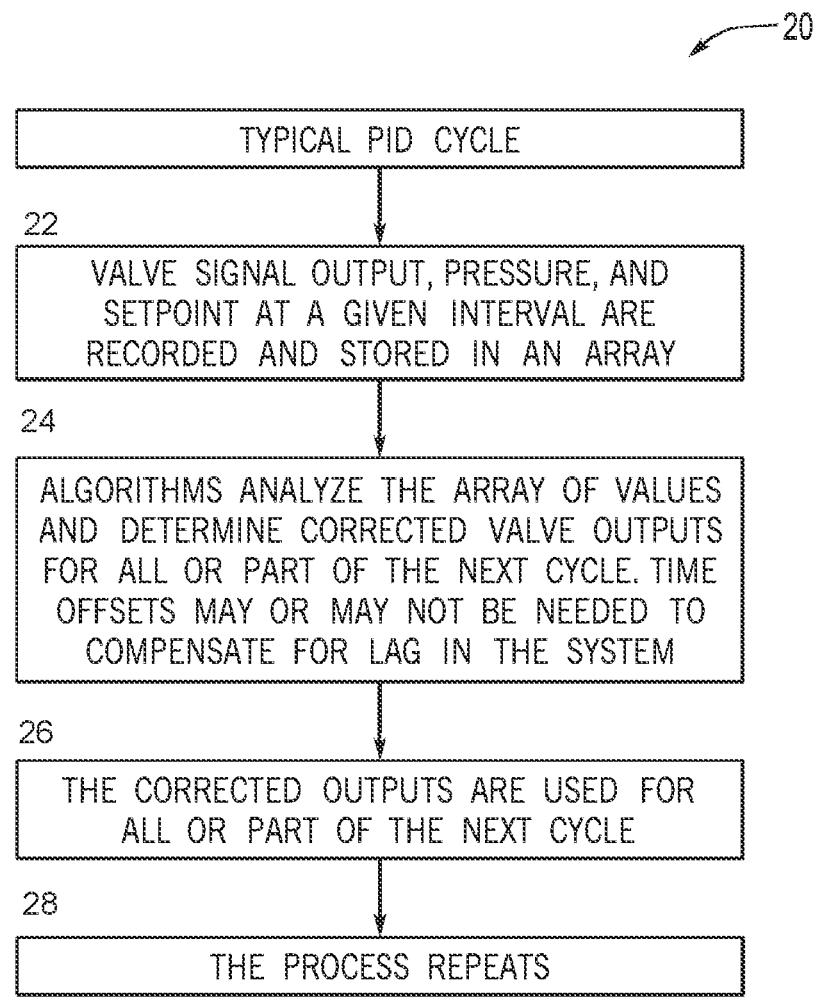
FIG. 2 is a flowchart for a tire curing bladder control process according to aspects of the present invention.

As seen in reference to FIG. 2, a method according to aspects of the present invention is shown that analyzes the data and controls the process during operational cycles.

In a first step 22, an initial curing bladder operational cycle is performed. A valve signal output, pressure, and a setpoint at a specified time interval are recorded and stored in an array. The array data is stored and at 22, the array data is analyzed by an algorithm to optimize the operational parameters for a subsequent operational cycle in order to more precisely control the pressure and limit the deleterious effects of pressure overshoot and undershoot conditions. The algorithms determine corrected valve outputs for all or part of the next operational cycle. Time offsets, if needed, may be provided to compensate for a lag time in the system. During a subsequent duty cycle, at 26, the corrected outputs are used for all or part of the subsequent cycle. At 28, the process repeats, adjusting operational parameters as the system is used.

As will be appreciated by those of skill in the art, the performance characteristics of each of the control valve 12, tire curing bladder 14, and the pressure transducer 18 will influence the operational parameters during the duty cycle. Accordingly, the algorithms are configured based on the performance of the respective components utilized within the system 10.

Figure 4:
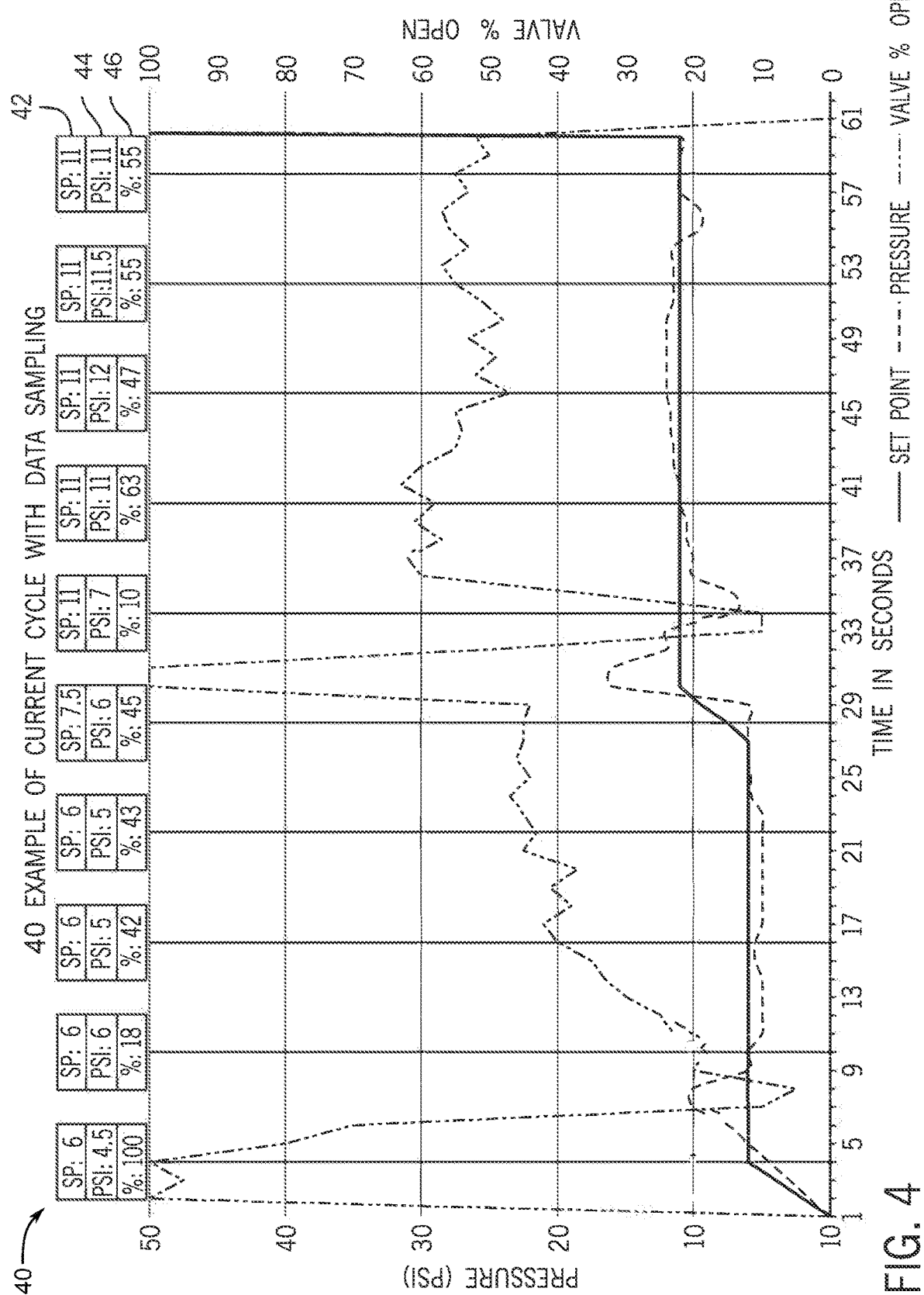
FIG. 4 is a graph illustrating the improved data sampling of the present invention.

As seen in reference to FIG. 4, when employing the system 10 of the present invention that is configured to learn from the operational parameters programmed for the previous cycles, the operational parameters are continuously adjusted to more accurately achieve desired set points in a subsequent cycle.

The program does not rely solely on PID control loops. Instead, the pressure within the tire curing bladder 14 is controlled by a program that analyzes input data to a controller and adjusts the PLC 18 setting to a control valve 12 based on that input data. Thus, the program is learning from the previous cycles.

As will be familiar to those of skill in the art, current PID systems have a time lag between the time the control valve 12 setting is changed by the program and the time at which the corresponding pressure change in the tire bladder 14 is achieved. These systems use fixed settings that do not learn from previous cycles, thus they do not improve with cycle counts.

Components of the present invention include the following:
1. A PLC 16 configured to execute a routine that collects an array of data for pressure, set point, and signal output inside a tire curing bladder 14 during the tire curing press cycle.
2. A program routine that analyzes the data and changes the output signals for the subsequent cycle; and
3. A program routine that uses the output signals to control of the subsequent cycle.

Program routine 1 collects setpoint, pressure, and output signal data from the tire curing press cycle. Program routine 2 analyzes the data and uses algorithms to create output signal data for the next cycle. Program routine 3 controls the pressure in the next cycle by using the signal outputs created by program routine 2.

Figure 3:
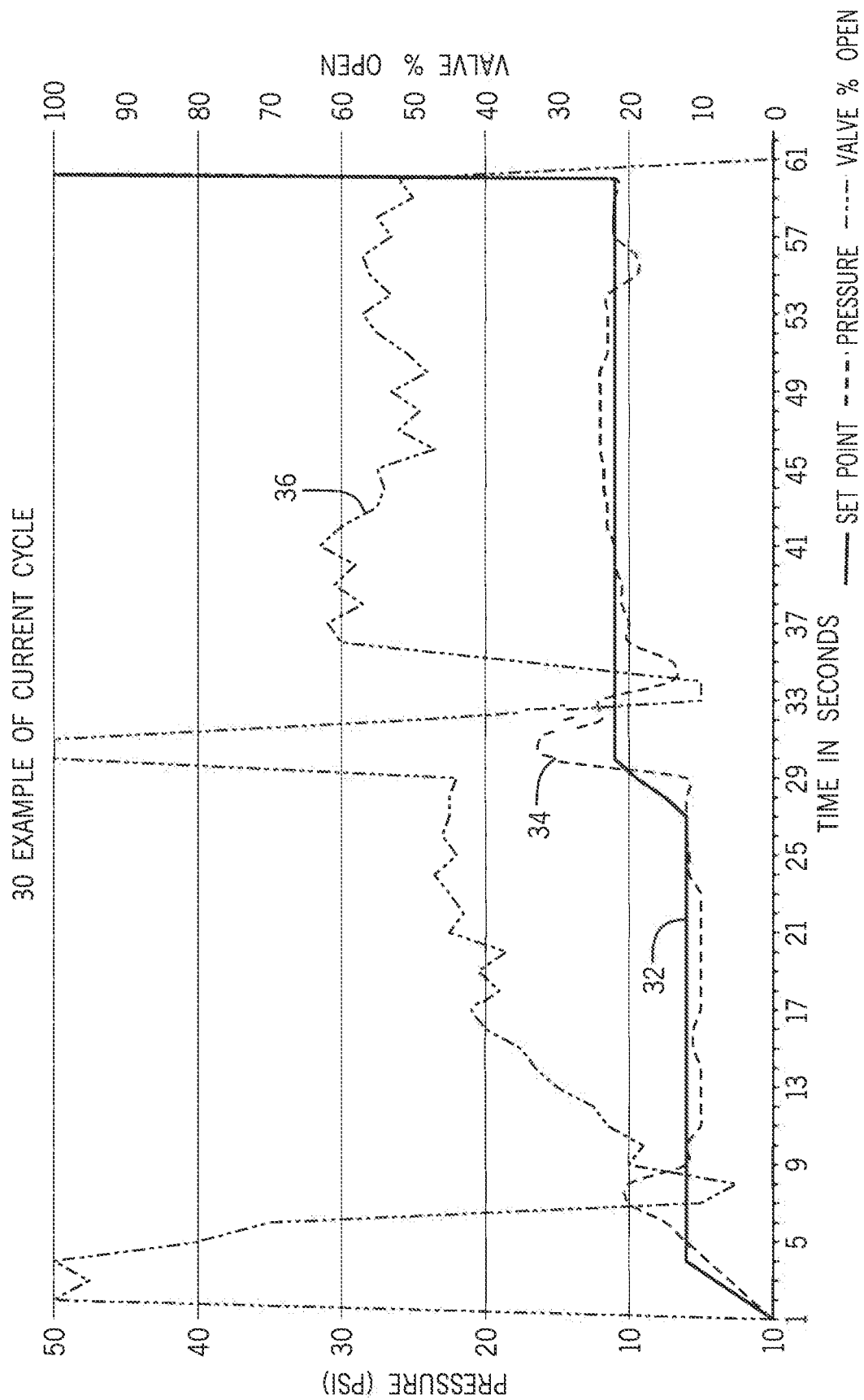
FIG. 3 is graph illustrating an example of operational parameter behavior utilizing conventional tire curing bladder controls.

As seen in reference to FIG. 3, an example of a current cycle is shown. The desired set point 32 for the pressure within the tire curing bladder 14 through a duty cycle is shown in the solid line. A pressure 34 measured by the pressure transducer 18 during the current duty cycle is shown by the dashed line. A corresponding valve position of the control valve 12 is shown in the dash-dot-dash line.

As may be seen, the pressure within the tire curing bladder 14 experiences an overshoot and an undershoot condition during the duty cycle. The overshoot conditions are most pronounced at transitions in the desired set point, while the undershoot conditions are most pronounced as the operation of the control valve 12, reflected in the % open, attempts adjust the pressure within the tire curing bladder 14 to the desired setpoint. As indicated, there currently exists a tendency for overshoot and undershoot of the set point values within the tire curing bladder 14.

As seen in FIG. 4, a data array of each of the set point 42, the pressure 44, and the % open condition are recorded during various points of the duty cycle. The PLC 12 is controlled by a program that analyzes input data array and adjusts the setting to the control valve 12 for a subsequent duty cycle based on that input data array.

The data collected from a previous cycle shows the errors in the current cycle. The amount of that error determines the change made to the signal outputs in the subsequent duty cycle. A data collection routine 22 is used to collect the data at variable intervals in the duty cycle. An error correction routine 24 is used to calculate the signal outputs for the next cycle, based on the error in the previous duty cycle. A duty cycle control routine controls the next cycle by applying the corrected signal outputs as inputs for the subsequent duty cycle.

In a non-limiting example, a sample algorithm can be illustrated by taking a data sampling from the array and applying a correction to that sampling to achieve results closer to the desired setpoint in the subsequent duty cycle. For example, if a sample data sampling might yield: setpoint=11, pressure=7, valve output=10% open. In the next cycle a correction needs to be applied to the control valve 12 output setting to obtain a sampled pressure value closer to the desired setpoint of 11. Considering there is a 36% error, the algorithm might add 36% to the valve output setting, making the valve output setting 46%. The algorithm could be written as:

$$OP374.2sC4 = OP374.2sC3 + (((SP374.2sC3 - PV374.2sC3)/SP374.2sC3)*100).$$

This corrected value would be limited to 0 and 100.
Where:
OP374.2sC4 is the valve output in % at 374.2 seconds into the cycle of the fourth cycle. This value populates the output array of the 4th cycle.
OP374.2sC3 is the valve output in % at 374.2 seconds into the cycle of the third cycle (value taken from the data sampling array of the third cycle).
SP374.2sC3 the setpoint at 374.2 seconds into the cycle of the third cycle (value taken from the data sampling array of the third cycle).
PV374.2sC3 the process variable, the measured pressure, at 374.2 seconds into the cycle of the third cycle (value taken from the data sampling array of the third cycle).

As will be appreciated from the present disclosure, this algorithm assumes there is no lag in the system. When a lag in the system is determined or estimated, it can be incorporated into an algorithm. For example, if lag was determined to be 0.3 seconds. The valve output would be observed 0.3 seconds earlier in the cycle, and the time correction would also be applied to the valve output that populates the array in the next cycle.

Using the previous example then:

$$OP373.9sC4 = OP373.9sC3 + (((SP374.2sC3 - PV374.2sC3)/SP374.2sC3)*100).$$

This value would be limited to 0 and 100.
Where:

OP373.9sC4 is the valve output in % at 373.9 seconds into the cycle of the fourth cycle. This value populates the output array of the 4th cycle.

OP373.9sC3 is the valve output in % at 373.9 seconds into the cycle of the third cycle (value taken from the data sampling array of the third cycle).

SP374.2sC3 the setpoint at 374.2 seconds into the cycle of the third cycle (value taken from the data sampling array of the third cycle).

PV374.2sC3 the process variable at 374.2 seconds into the cycle of the third cycle (value taken from the data sampling array of the third cycle).

Accordingly, a system, apparatus and method for programmable logic control of pressure in a tire curing press bladder according to aspects of the invention entails a data sampling from the previous cycle, analyzing the data, and using algorithms to create output settings for all or part of the next cycle.

When implemented, the system does not require any additional computing than that present on the PLC. As will be appreciated from the present disclosure, the invention may be implemented with other controllers operating in accordance with the foregoing.

It should be understood, of course, that the foregoing relates to exemplary embodiments of the invention and that modifications may be made without departing from the spirit and scope of the invention.

What is claimed is:

1. A method for controlling a tire curing bladder in a tire curing press, comprising:

measuring a plurality of performance parameters for each of a valve output signal controlling a pressure control valve supplying a source of pressurized fluid to the tire curing bladder and a pressure within the tire curing bladder during a previous duty cycle of the tire curing press;

storing the plurality of performance parameters as a data array representing a plurality of temporal positions within the previous duty cycle;

analyzing the plurality of performance parameters to determine a corrected valve signal output to obtain a desired setpoint within the tire curing bladder;

adjusting the valve output signal to the corrected valve signal output to reduce one or more of an overshoot condition and an undershoot condition of the pressure from the desired setpoint, wherein the corrected valve signal output at a selected temporal position in a subsequent duty cycle comprises the valve output signal in the previous duty cycle at a corresponding temporal position in the previous duty cycle and an error correction value for the corresponding temporal position in the previous duty cycle; and applying the corrected valve signal output to the pressure control valve during the subsequent duty cycle.

2. The method of claim 1, wherein the data array further comprises the desired setpoint at each of the plurality of temporal positions.

3. The method of claim 2, further comprising:

applying a lag to the corrected valve signal output.

4. The method of claim 3, further comprising:

adjusting the valve output signal to reduce one or more of the overshoot condition and the undershoot condition of the pressure from the desired setpoint at each of the plurality of temporal positions.

5. The method of claim 1, wherein the error correction value comprises:

a deviation of the pressure from the desired setpoint expressed as a percentage.

\* \* \* \* \*